April 15, 1969  J. B. NEIGHBOR  3,438,890
METHOD AND APPARATUS FOR SEPARATING SOLIDS-LIQUIDS MIXTURES
Filed Sept. 10, 1965
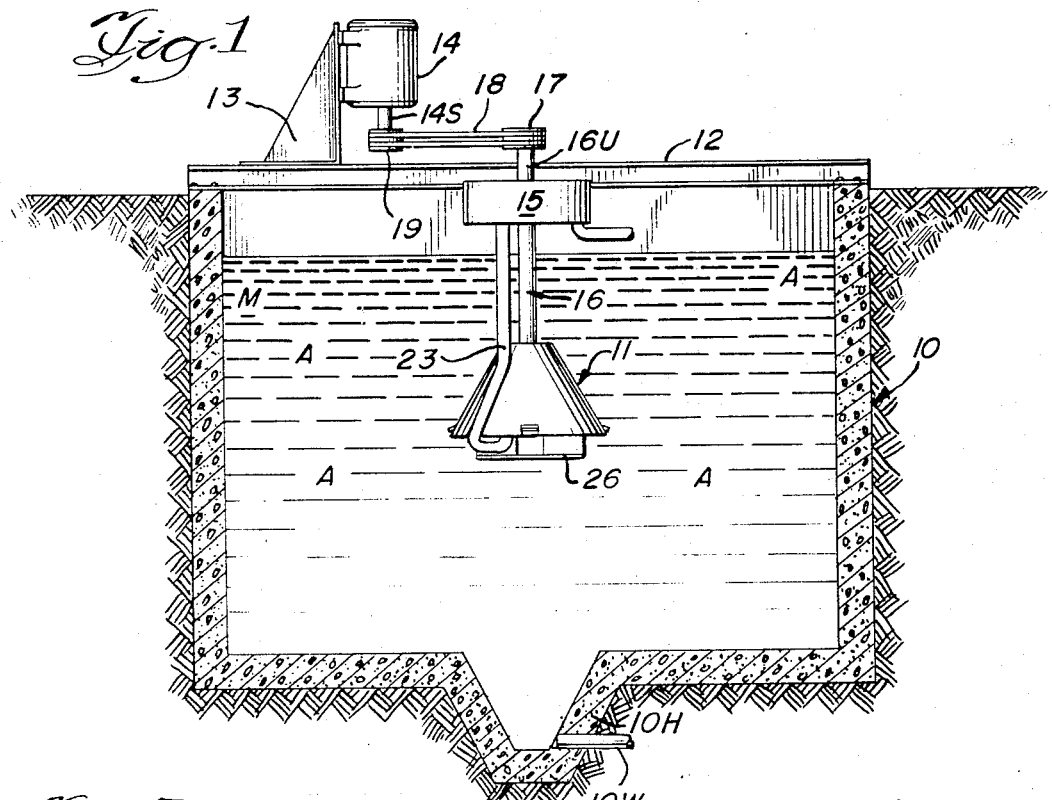
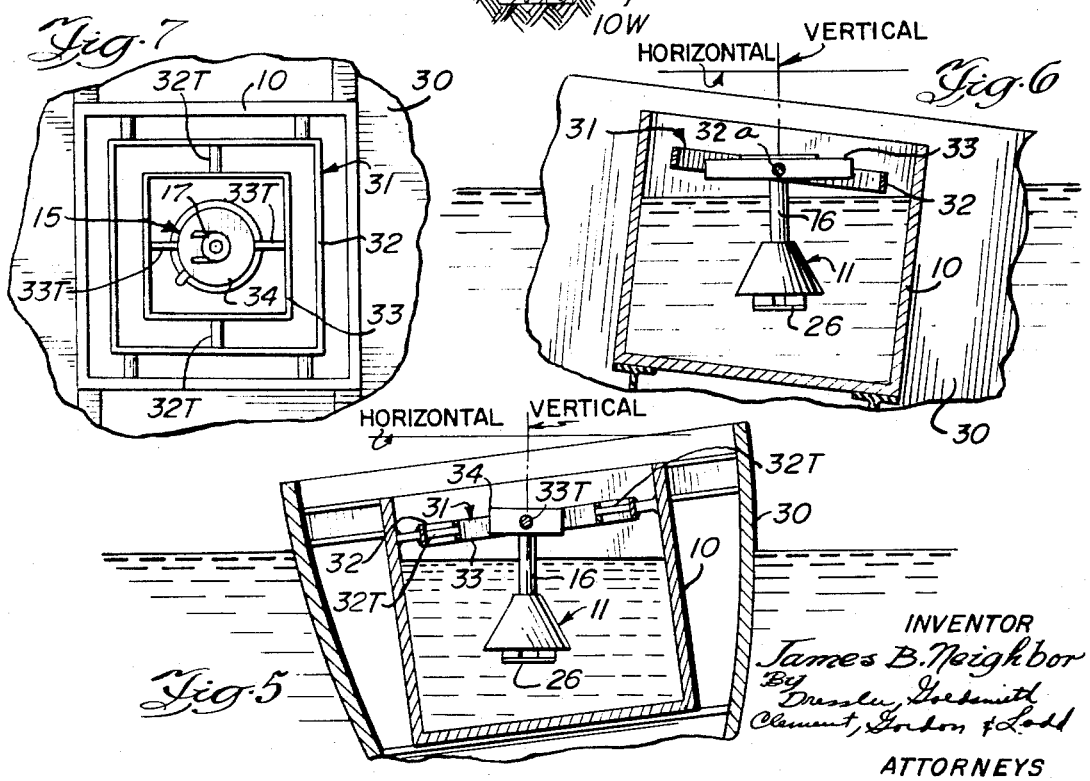
INVENTOR
James B. Neighbor
ATTORNEYS

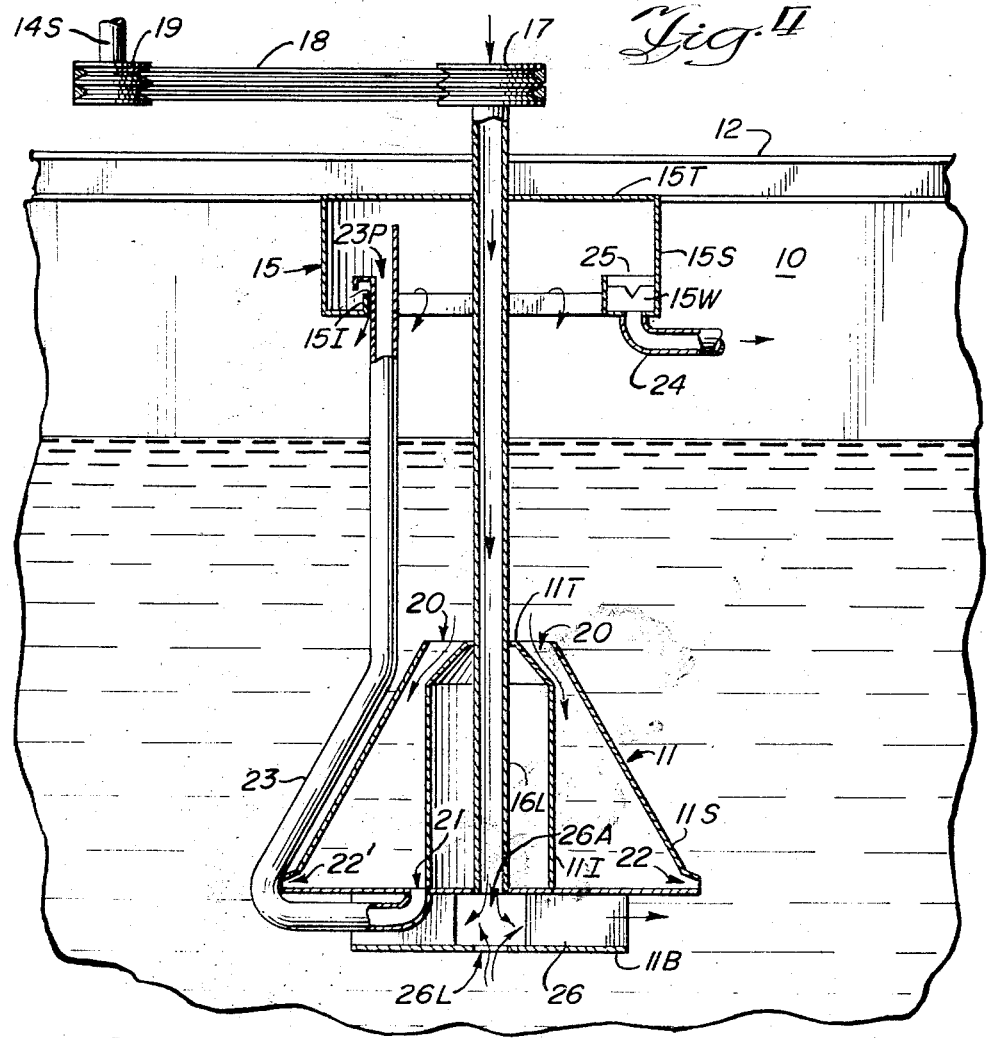
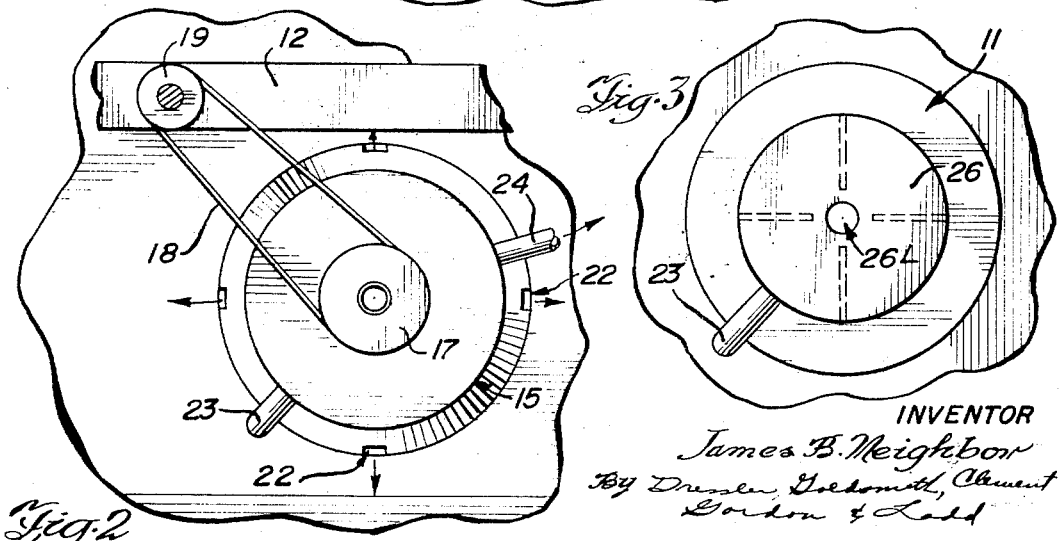

United States Patent Office 3,438,890
Patented Apr. 15, 1969

3,438,890
METHOD AND APPARATUS FOR SEPARATING
SOLIDS-LIQUIDS MIXTURES
James B. Neighbor, Mount Prospect, Ill., assignor to
FMC Corporation, a corporation of Delaware
Filed Sept. 10, 1965, Ser. No. 486,404
Int. Cl. C02c 1/24, 1/10
U.S. Cl. 210—14                                           15 Claims

ABSTRACT OF THE DISCLOSURE

Package sewage treatment plants are disclosed, one for land based installation and the other for marine installation. Each installation is shown with an aeration tank having a body of mixed liquor defining a liquid level therein, the mixed liquor being a solids-liquid mixture in which the solids are slowly settleable. A rotary separator is submerged in the mixed liquor and serves to produce a bodily flow of the mixed liquor through a centrifugal separator chamber where a differential centrifugal field acts to effect solids and liquid separation while the external effect of the rotary separator maintains the tank contents homogeneous as respects suspended solids and oxygen supply. A tubular rotary drive shaft has one end external of the body of mixed liquor and has an opposite end submerged and carrying an impeller blade structure, with a shell-like housing rigidly mounted on the shaft adjacent the impeller blade structure and defining the separating chamber. The housing end remote from the impeller has a mixture inlet and the other housing end has a solids outlet and a liquid outlet at radially spaced locations. A receiving tank is located above the liquid level defined in the aeration tank and a delivery line rotates with the housing and leads from the radially inward solids outlet to terminate at a discharge location radially outward of the mixture inlet and in communication with the receiving tank.

---

The present invention relates to apparatus for separating solids from a liquid in which they are only slowly settleable. More particularly, it relates to apparatus for separating the liquid menstruum of treated mixed liquor in activated sludge type sewage treatment plants from the solids present. Still more particularly, it relates to apparatus which simultaneously maintains the contents of an aeration tank homogeneous from the standpoint of suspended solids and oxygen supply and also separates a clarified effluent and discharges it from the treatment system.

Settling of the solids suspended in liquid mediums is often one of the more time consuming and costly steps of a process. The time required to settle solids from suspensions generally varies with the physical characteristics of the solids and liquid, e.g. relative densities, etc. One of the more difficult materials to settle quickly is the flocculant solids such as aluminum hydroxide flocs formed in the treatment of water, flocs of microorganisms formed in the treatment of sewage, and the like.

These flocculant solids not only are difficult to concentrate but also are readily disintegrated with a further loss of settling character. In addition, mild eddy currents in the settling tanks due to, for example, the rocking action of a marine vessel, the introduction of influent material at too high a velocity, etc., may be sufficient to seriously hamper the settling operation.

Now it has been discovered that separation of solids from liquids which are difficult to concentrate, may be accomplished rapidly, and in a manner preventing disrupting influences from coming into play.

In accordance with this invention, a treatment system is provided that includes a shell-like separator structure that can be submerged in a holder containing a solids suspension and that is rotatable to effect movement of a portion of the tank contents through an isolated space defined within the separator structure, this rotation serving to separate a clarified liquid by imposing centrifugal forces upon the isolated solids suspension. The forces effecting simultaneous movement and separating actions operate to pump or to discharge clarified liquid or effluent to a launder outside the shell-like separator structure or the tank within which the structure is usually positioned below the normal liquid level.

The rate of discharge of the system may be closely regulated at the launder by appropriate metering techniques or other means, with any excess of effluent being permitted to overflow back to the tank.

In addition, the rotating separator structure may be supported from and driven by a shaft adapted to provide an air conduit with outlet below the separator structure for dissemination of air in the main body of suspension in the tank. A blade structure may be employed which will serve the mechanical stirring function of maintaining the suspension in circulation in the tank and may in cooperation with means for introducing air disseminate the air as a dispersed gas.

Other features and advantages of the invention will be apparent from the following descriptions and claims, and are illustrated in the accompanying drawings which show structure embodying features of the present invention and the principles thereof.

In the general practice of the methods of this invention, a solids-liquid mixture, wherein the solids and liquid are slowly settleable under low or normal gravity conditions, is separated by producing bodily flow of the mixture generally endwise through a chamber, concurrently imposing a differential centrifugal field transverse to the flow to effect migration in opposite radial field directions of the solids and the liquids in such flow and separately drawing off the liquids and solids at radially spaced regions located downstream in the chamber.

The flow chamber is preferably located in submerged position in the mixture to facilitate the desired throughput flow and the separated liquid being discharged to an external liquid receiving region and the separated solids being either returned directly to the mixture or discharged outside the system. The main body of the mixture generally, is maintained in suspension and constant circulation by the blade structure or by independent means such as introduction of air.

Apparatus for separating menstruum from difficult to settle solids, in accordance with this invention, consists of a housing preferably submerged in the mixture to define the separating chamber and at one end is provided with a mixture inlet and at the other end is provided with radially spaced outlets for solids and liquids, a delivery line leading from the radially inner outlet to terminate at a location radially outward of the inlet, and means for rotating the housing and delivery line in unison about a central axis to create bodily flow of the mixture through the chamber under the influence of a differential centrifugal field to cause clear liquid to migrate towards the liquid outlet and to cause solids to migrate towards the solids outlet during flow through the chamber.

In the accompanying drawings forming a part of the specification, and in which like numerals are employed to designate like parts throughout the same;

FIG. 1 is a generalized transverse sectional view illustrating an aeration tank equipped with a rotating aerating separation unit to provide a compact package waste treatment plant;

FIG. 2 is a top plan view of the rotating aerating separation unit;

FIG. 3 is a bottom plan view of the same unit;

FIG. 4 is an enlarged transverse sectional view through the rotating aerating separation unit of FIG. 1;

FIG. 5 is a generalized transverse sectional view illustrating the adaptation of the invention to a marine sewage treatment plant wherein the ship is shown in diagrammatic outline and the rotating aerating separation unit is gimbal mounted to remain vertical independently of movement of the ship;

FIG. 6 is a fragmentary section taken on the line 6—6 of FIG. 5; and

FIG. 7 is a top plan view better illustrating the gimbal mount of FIG. 5.

Referring now to the drawings, while the invention has application in the broad field of waste treatment, there is shown in FIGS. 1–4, for purposes of illustrative disclosure, a package sewage treatment plant for land based installations and there is shown in FIGS. 5, 6 and 7 a package sewage treatment plant for marine installations. The apparatus is uniquely suited for installations where the conditions of motion, such, for example, as are normally encountered by ships at sea, frequently would preclude conventional sludge separation techniques that depend upon establishing a quiescent zone for gravity separation.

While the invention offers exceptional advantages in marine installations for reasons that it overcomes problems occasioned by a ship's motion, the principle of operation by which the invention separates solids from liquids of only slightly different specific gravity provides important advantages such as faster recovery of sludge, in land based applications. Substantial improvements in respect to factors of space, weight and cost provide advantage in installations of both types.

In the land based waste treatment plant arrangement of FIG. 1, a fixed aeration tank is designated generally at 10 and is shown as including a trough shaped collection hopper 10H equipped with a drawoff pipe 10W for receiving denser solids separating from suspension in the body of mixed liquor M contained in the tank. The body of mixed liquor is normally maintained in a continuously circulating flow pattern illustrated by the arrows A in FIG. 1. The circulating pattern can be influenced by a combination of mechanical stirring and aeration effects either directly associated with a rotating separation unit 11 submerged therein or completely independent thereof. In either case, the circulation pattern may be arranged to insure maintaining the desired suspension condition with sludge ratio factors as high as 30,000 to 50,000 p.p.m. One advantage of the waste treatment system of the present invention is its flexibility permitting handling materials with wide variation in solids concentrations, i.e., at these levels as well as at the somewhat lower operating levels usually associated with gravity type sludge separation systems.

To mount the separation unit 11, the tank 10 is bridged by a super-structure 12 which includes a mount 13 for a drive motor 14. The super-structure 12 supports an effluent reception tank 15 of annular configuration arranged concentrically about a central vertical shaft 16. Suitable thrust and rotary support bearings (not shown) are provided on the super-structure and mount the drive shaft 16 for rotation about a vertical axis.

The shaft 16 is disposed with its upper portion 16U above the body of mixed liquor within the aeration tank and suitably journaled in the support bearings (not shown). The upper end of the shaft may be equipped with a pulley 17 driven by a belt 18 which is trained about a drive pulley 19 carried on the shaft 14S of the motor. The shaft has a lower portion 16L submerged in the body of mixed liquor and mounting the generally vertically extending rotatable separation unit 11 to encircle the shaft for joint rotation therewith.

The separation unit 11 is completely submerged in the body of mixed liquor and consists of an annular shell structure having a top wall 11T, a bottom wall 11B, an annular inner wall 11I and an outer surrounding wall 11S. The length and spacing of the walls 11I and 11S and the slope, if any, of the surrounding wall 11S are arranged in accordance with the required volume and flow through capacity for the separation unit, the speed of rotation and various sludge settling factors which are related in more detail hereinafter.

The top wall 11T of the shell structure has liquid inlet means 20 establishing communication between a region of the body of mixed liquor adjacent the top of the shell and an upper radially inward region enclosed by the shell. The bottom wall 11B of the shell has at least one radially inward liquid outlet 21 and a series of radially outward solids outlets 22 at its periphery. A liquid delivery line 23 communicates between the bottom liquid outlet 21 and the effluent reception tank 15.

The radial location of the inlet 20 and the outlets 21 and 22 and the submerged mounting relationship of the shell structure causes it to function as a filled full pump developing a determinable flow through capacity.

As illustrated in FIG. 4, the delivery line 23 extends radially outwardly beneath the bottom wall of the shell then upwardly alongside the surrounding wall 11S and then vertically to a location adjacent the inner periphery of the annular reception tank 15. During rotation of the drive shaft and shell, the delivery line 23 also rotates through a circular path with its upper and outlet port 23P always remaining adjacent and facing toward the inner periphery of the reception tank 15.

The rotary movement imparted to the delivery line 23 results in a centrifugally induced pressure head acting to pump liquid upwardly through the line, with the liquid being discharged through the port 23P being slung radially outwardly. The centrifugal pressure relationships are adjustable by varying the speed of rotation and/or by varying the radial position of the delivery port 23P in relationship to the radial position of the top liquid inlet 20.

The reception tank 15 has side and top wall structures 15S and 15T, respectively, serving as a splash shield to confine the effluent in the reception tank.

The annular reception tank 15 is of channel-shaped cross section and has a weir 15W of suitable configuration feeding a segregated region that opens into an effluent discharge line 24. At the region of the weir, a cover 25 is provided to prevent any direct discharge to the line 24 of the liquid which is splashing out of the upper end of the delivery line. In the arrangement illustrated, the inner wall 15I of the reception tank is located at an elevated relationship to the weir 15W so that the wall 15I serves as a broad crested weir overflowing effluent back to the aeration tank. With this arrangement, so long as there is liquid filling the reception tank, treated effluent will flow in quantities dependent upon the setting of the adjustable weir 15W.

It can be shown that the settling velocity of a sludge particle in a centrifugal field is directly proportional to the terminal settling velocity computed by application of Stokes law to the conventional gravity sedimentation systems. The settling velocity in a centrifugal field can also be shown to be directly proportional to the radius position of the particle in the centrifugal field and the square of the angular velocity. The relationships are such that centrifugal force effects increase the sludge settling velocity and this in turn makes possible significant reductions in the volume of the settling zone. Thus, a rotating separation tank is feasible as a settling device because its principle of operation enables its size to be limited to practical values.

Just as the flow through the delivery line 23 is centrifugally induced, the total volume flow through the shell is determined by the size and radial position of the top inlet 20 and the size and radial position of the bottom outlets 21 and 22 and the delivery line outlet 23P and, of course, the speed of rotation. The rotating shell develops a pumping action determined by its structure and mode of operation for producing a determinable volume flow through velocity. The required flow through velocity may be widely controlled to achieve optimum system performance under various operating conditions encountered. This may be done substantially independently of the total system flow through ratings which in the arrangement presently disclosed are determined primarily by the relationship between the V-notch weir 15W and the broad crested weir 15I.

The rotation of the separation unit 11 also develops centrifugal effects acting on the mixed liquor during its bodily flow through the shell. The shell is maintained substantially full during its rotation by appropriate sizing of the inlet 20 and by maintaining the inlet effectively submerged within the body of mixed liquor contained in the tank 10. The full condition of the shell results in the centrifugal effects acting as a differential centrifugal field tending to separate the constituents of the flow in accordance with their specific gravity values. Thus, the flocculant solids, having a slightly greater specific gravity than the liquid menstruum, move radially outwardly towards the surrounding wall 11S of the shell while the clear liquid effluent moves radially in towards the inner annular wall 11I of the shell. At the inlet 20, the mixed liquor is substantially homogeneous and as the flow continues towards the outlets, clear liquid effluent migrates radially inwardly and a concentrated sludge liquid mixture migrates outwardly with the solids normally tending to contact the outer surrounding wall 11S and being carried along that wall by the bodily flow through velocity pattern. In the arrangement illustrated wherein the separation tank is rotatable about a vertical axis and induces downward flow, gravity assists the solids movement along the outer shell wall. The invention is not limited to this configuration as upward flow is also practical. Moreover, the axis of rotation may be other than vertical.

The speed of rotation is a significant control factor as it determines the flow through velocity and also the tendency of the solids to stick against the outer wall. On the one hand, rotational speeds are unduly low if they fail to develop enough centrifugal separation effects to insure that no solids exit through the liquid outlet 21. On the other hand, rotation speeds are too great if they impact the solids against the outer shell wall 11S with forces which inhibit movement of solids along that wall. The centrifugal force effects increase as the square of the speed of rotation and as the first power of the radius position of the solid particle so that the lower limit of the speed of rotation is an absolute restriction which must be satisfied before considering the angle or slope of the surrounding shell wall. Changes in this angle to accommodate higher centrifugal force effects introduce increasing radius factors tending to defeat the increase in angle and lead to radial enlargement which is impractical. This friction effect of solid particles against an outer wall leads to the requirement for slow speed separation units and is an important factor in the successful practice of the present invention.

The pumping capacity generated by the rotating separation unit 11 will not change the liquid level in the tank 10 so long as incoming sewage is introduced at the same rate that effluent is discharged through the weir 15W. There can, however, be variations in the amount of effluent overflowing the broad crested weir 15I and returning to the aeration tank 10 depending upon the volume of liquid entering the aeration tank.

In the event that supply of incoming sewage is terminated, the separating unit 11 maintains its pumping effect and under these conditions will gradually lower the normal level maintained in the tank 10 until the pumping head acting on the delivery line 23 is no longer great enough to sustain a flow into the effluent reception tank 15 at which point continued discharge of treated effluent over the V-notch weir 15W must terminate. The separation unit 11 continues to rotate and recycle the contents of the aeration tank but no liquid is discharged from the total system. When sewage is again supplied to the aeration tank 10, the liquid level rises and treated effluent is again pumped through the delivery line 23 into the reception tank 15 for discharge through the V-notch weir 15W. Thus, at peak rates of sewage inflow to the system the pressure head acting in the tank 10 causes increased amount of recirculation. However, the amount of treated effluent exiting over the weir and through the discharge line 24 remains constant.

For purposes of illustrative disclosure, typical values are given for a sewage treatment plant for treatment of 1,000 gallons per day of sewage at 300 B.O.D. The air requirement for such a plant is about 2½/2 c.f.m. and an aspirating impeller blade structure 26 is shown fixed at the lower end of the tubular shaft 16 to underlie the bottom wall 11B of the shell. Upon rotation of the shaft 16 and the shell, the blade structure 26 draws air through the shaft and injects it into the contents of the tank 10. For this purpose, the blade structure has an air inlet eye 26A communicating with the lower end of the shaft and a liquid inlet eye 26L communicating with the tank contents, with an air and liquid mixture being discharged at the periphery of the structure and serving in conjunction with the blade rotation to establish the desired circulation of the tank contents pictured by the arrows A in FIG. 1.

For the particular 1,000 gallon per day plant, the upper end of the separation tank may be located 12" or more below the surface level. The inlets 20 consist of four 2" diameter openings spaced uniformly about the axis of the shaft 16 and located radially thereadjacent. The clarified effluent outlet 21 was chosen at a ¾" diameter, sharp edged orifice feeding the delivery line 23 which may be a 1" diameter pipe. A single delivery line is adequate for the required pumping action but a second dummy line can be provided to give dynamic balance.

The inlets 20 have an effective radius position from the axis of the shaft 16 of about 3½". For this condition, the discharge port 23P of the delivery line 23 has a radius position of about 6½". The outlets 22 for the solids are here illustrated as a set of four approximately 1" diameter orifices at a radius position of about 12".

For example, if the overall height of the rotatable tank 11 is about 18–20" for operation in the 1,000 gallon per day plant, a speed of rotation of about 100 r.p.m. would be employed. For these values, the angle of the surrounding wall 11S is about 30° from vertical to insure that solids contacting this wall will not stick. The value of the angle will depend upon the centrifugal effects and the characteristics of the solids material and of the surrounding wall itself, and wide variations from the given value may be expected depending upon the particular application involved.

A marine installation incorporating a separation unit constructed in accordance with this invention is illustrated in FIGURES 5, 6 and 7 wherein the hull 30 of a ship is shown equipped with an aeration tank 10 which is fixed to the hull to follow the movement of the ship. The tossing and pitching conditions of motion experienced by a ship impose severe limitations upon a gravity type sedimentation system as the quiescent settling action cannot be sustained in the presence of such violent motion.

In accordance with the present invention, a rotating separation unit 11 is not dependent upon maintaining quiescent conditions and thus lends itself to marine installations. In particular, the unit 11 may be supported from a gimbal mounting structure 31 which, as best seen in FIG. 7, includes a stationary gimbal frame 32 supporting a pair of opposed trunnions 32T on which a movable gimbal frame 33 is journaled to rotate about a first axis. The movable frame 33 carries a set of opposed trunnions 33T oriented transversely of the first set and rotatably supporting a suspension frame 34 for rotation about a normal axis. The mounting shaft 16 is carried by the suspension frame 34 and supports the separation unit 11 in submerged relation within the contents of the tank 10. A motor, not shown, is supported directly on the suspension frame 34 and connected to drive the shaft 16 to rotate the separation unit 11 about a central axis which is vertical when the hull is in neutral position. The gimbal mounting for the continuously rotating separation unit 11 accommodates a gyroscopic effect tending to maintain a vertical axis for the rotating shaft 16 and the rotating separation unit 11 in the presence of movement of the hull 30 and of the aeration tank 10. The gimbal mounting relieves serious stress problems that would arise were the axis of the tank and shaft to be fixed in relation to the hull and the aeration tank. While not illustrated herein, the configuration and shielding for the upper end of the aeration tank 10 will be appropriate for the particular location of the sewage treatment unit within the ship as well as for the conditions of roll and pitch, all for minimizing the surface effect and splashing in the tank 10.

The arrangements disclosed herein exhibit a proper balance as respects sludge settling factors and centrifugal effects. From the standpoint of sludge handling, the inlet openings 20 and sludge outlets 22 are of substantial size to insure passage of sludge and other solid particles without clogging. The surrounding wall 11S of the rotating shell is smooth and appropriately angled to allow for desired travel of sludge particles actually contacting the wall. In the particular arrangement illustrated herein, a symmetrical unobstructed isolated space is defined within the shell 11 to enable bodily flow through and separation without adverse turbulence and eddy current effects. A minimum number of projections internally and externally of the shell avoid entrapment or entwining of stringy materials. In short, the invention provides primary emphasis upon the sludge control and flow factors and adapts centrifugal principles to the needs of the sludge system.

The above description has been based upon application of the apparatus to concentration of sewage sludge. Separation of sludge produced in extended aeration plants is only one application, for the apparatus can be utilized to concentrate solids in sewage plants operating with cationic active materials present as flocculators for colloidal materials, in water treatment plants using coagulants for water purification, and the like.

What is claimed is:

1. A method for separating solids from a solids-liquid mixture in which the solids are slowly settleable under gravity settling conditions, said method comprising producing a bodily flow of the mixture generally endwise through a chamber and concurrently imposing a differential centrifugal field in the chamber generally transversely of the direction of the flow to effect migration in opposite radial directions relative to said field of the solids and of the liquids in said flow, separately drawing off liquids and solids suspensions at locations radially spaced relative to said field, accumulating clarified liquid at an area elevationally spaced from the solids-liquid mixture, metering the release of the liquid from said area to determine the system discharge rate, and returning the remainder of the drawn off liquids to said mixture for recirculation through said chamber.

2. The method of treating sewage which comprises establishing a mixture of sewage and sludge to define a normal liquid level in a zone adapted for aeration of said mixture, passing oxygen-containing gas into said mixture in quantities to satisfy a major portion of the B.O.D. establishing a liquid receiving zone outside said aeration zone, bodily pumping the mixture unidirectionally through a segregated space submerged below the normal liquid level of said mixture, subjecting the segregated mixture during flow through said space to a differential centrifugal field oriented generally transversely of the direction of flow to effect migration of a concentrate of solids towards a radially outer field region of said space and to effect migration of a clear effluent towards a radially inner field region of said segregated space, discharging concentrated solids from the space through the radially outer field region to return to the mixture in said aeration zone, and discharging clarified effluent from the radially inner field region to said liquid receiving zone.

3. In apparatus for separating solids from a solids-liquid mixture in which the solids are slowly settleable under gravity settling conditions, said apparatus having a tank providing a reservoir for said solids-liquid mixture to define a liquid level therefor, a housing submerged in the mixture and defining a separating chamber having a mixture inlet at one end and radially spaced outlets for solids suspension and liquid, a delivery line leading from the radially inner outlet and terminating at a discharge location radially outward of the inlet and elevated above said liquid level, and means for rotating the housing and delivery line in unison about a central axis to create bodily flow of the mixture through the chamber under the influence of a differential centrifugal field to cause clear liquid to migrate towards said liquid outlet and to cause solids to migrate towards said solids suspension outlet during flow through said chamber and to cause discharge flow through said delivery line to said discharge location.

4. In apparatus for separating solids from a solids-liquid mixture in which the solids are slowly settleable, a tubular shaft having one end external of the mixture and provided with an intake and having an opposite end submerged in the mixture and carrying an impeller blade structure, a housing fixed on the opposite end of the shaft adjacent the impeller blade structure to be submerged in the mixture and defining a separating chamber having a mixture inlet at one end remote from the impeller blade structure and radially spaced solids suspension and liquid outlets at the end adjacent the impeller blade structure, a delivery line leading from the radially inner outlet and terminating at a location radially outward of the inlet, means for rotating the housing and delivery line in unison about a central axis through said shaft to create bodily flow of the mixture through the chamber under the influence of a differential centrifugal field to cause clear liquid to migrate towards said liquid outlet and to cause solids to migrate towards said solids suspension outlet during flow through said chamber.

5. In apparatus for separating solids from a solids-liquid mixture in which the solids are slowly settleable, said apparatus having a tank providing a reservoir for said solids-liquid mixture to define a liquid level therefor, a housing submerged in the mixture and defining a vertically extending separating chamber having a mixture inlet at the top end and radially spaced solids suspension and liquid outlets at the bottom end, a delivery line leading from the radially inner outlet and terminating at a discharge location radially outward of the inlet and elevated above said liquid level, means for rotating the housing and delivery line in unison about a central vertical axis to create flow of the mixture vertically through the chamber and concurrently to subject the flowing mixture to the influence of a differential centrifugal field operating transversely to the vertical flow to cause clear liquid to migrate towards said liquid outlet and to cause solids to migrate towards said solids suspension outlet during flow through said chamber and to cause discharge flow through said delivery line, and a reception tank encircling said axis above said liquid level at a location to receive discharge from said delivery line.

6. In apparatus for separating solids from a solids-liquid mixture in which the solids are slowly settleable, a tubular shaft having one end external of the mixture and provided with an intake and having an opposite end submerged in the mixture and carrying an aspirating impeller blade structure communicating with said intake through said shaft, an endwise extending hollow shell fixed on said shaft and disposed adjacent the impeller blade structure in submerged relation in the mixture for rotation about a central axis through said shaft, said shell having radially inwardly located inlet means at one axial end and having radially spaced inner and outer exit means at the other axial end, a liquid delivery line leading from said inner exit means and discharging at an external location spaced radially outward of the location of the inlet means, and means to rotate the shell and delivery line in unison about said axis to create bodily flow of mixture axially through said shell under the influence of a differential centrifugal field to cause clear liquid to migrate towards said inner exit means and to cause solids to migrate towards said outer exit means.

7. In an activated sludge type sewage treatment system having means including an aeration tank for holding a body of mixed liquor that defines a liquid level in said tank, said body of mixed liquor being comprised of flocculant solids that are slowly settleable from the liquid menstruum, apparatus for separating the liquid menstruum from the mixed liquor and comprising a generally vertically extending shell having a surrounding wall, said shell having radially inwardly disposed inlet means at one end and having radially spaced inner and outer outlet means at the other end, means mounting the shell for rotation about a vertical axis in submerged relation in the body with said inlet means communicating with a region of the body adjacent the shell, a liquid delivery line leading upwardly from said radially inner outlet means and discharging at a point above said liquid level and spaced radially farther from said axis than is the location of said inlet means, and means to rotate the shell and delivery line about said axis to enable bodily flow of the mixed liquor in a friction induced spiral vortex pattern moving generally vertically downwardly therethrough, with the flocculant solids within the shell having a radial settling velocity component and a vertical flow velocity component to move along a path angling radially and vertically towards the surrounding wall of the shell.

8. In an activated sludge type sewage treatment system having means including an aeration tank for holding a body of mixed liquor that defines a liquid level in said tank, said body of mixed liquor being comprised of flocculant solids that are slowly settleable from the liquid menstruum, apparatus for separating the liquid menstruum from the mixed liquor and comprising a generally vertically extending shell having a surrounding wall, said shell having radially inwardly disposed inlet means at one end and having radially spaced inner and outer outlet means at the other end, means mounting the shell for rotation about a vertical axis in submerged relation in the body with said inlet means communicating with a region of the body adjacent the shell, a liquid delivery line leading upwardly from said radially inner outlet means and discharging at a point spaced above said liquid level and spaced radially farther from said axis than is the location of said inlet means, and means to rotate the shell and delivery line about said axis to enable bodily flow of the mixed liquor in a friction induced spiral vortex pattern moving generally vertically downwardly therethrough, with the flocculant solids within the shell having a radial settling velocity component and a vertical flow velocity component to move along a path angling radially and vertically towards the surrounding wall of the shell, said surrounding wall having an angle to vertical insuring travel towards said radially outer outlet means of any solids contacting said wall.

9. In an activated sludge type sewage treatment system having means including an aeration tank for holding a body of mixed liquor that defines a liquid level in said tank, said body of mixed liquor being comprised of flocculant solids that are slowly settleable from the liquid menstruum, apparatus for separating the liquid menstruum from the mixed liquor and comprising a generally vertically extending shell, said shell having radially inwardly disposed inlet means and having radially spaced inner and outer outlet means, means mounting the shell for rotation about a vertical axis in submerged relation in the body of mixed liquor with said inlet means communicating with a region of the body adjacent one end of the shell and with the radially outer outlet means communicating with a region of the body adjacent the other end of the shell, a liquid delivery line leading upwardly from said radially inner outlet means and discharging at a point above said liquid level and spaced radially farther from said axis than the location of said inlet means, and means to rotate the shell and delivery line about said axis to enable bodily flow of the mixed liquor generally therethrough, with the flocculant solids within the shell having a radial settling velocity component and a vertical flow velocity component to move towards the surrounding wall of the shell, said surrounding wall having an angle to vertical insuring travel towards said outlet means of any solids contacting said wall.

10. In a system having a tank for holding a body of mixed liquor comprised of a liquid menstruum and flocculant solids of slightly greater specific gravity than the liquid menstruum, apparatus for separating the liquid menstruum from the mixed liquor and comprising a vertically extending shaft having an upper portion above the body and having a lower portion submerged in the body, liquid receiving trough means at least partially encircling said upper portion, a generally vertically extending shell fixed on said lower portion and having a surrounding wall of maximum diameter at one end of the shell, said shell having radially inwardly disposed inlet means at the other end and communicating with a region of the body there adjacent and said shell having spaced radially inner and outer outlet means at said one end, said radially outer outlet means communicating directly with the body of liquor and said radially inner outlet means communicating with a liquid delivery line that empties into the liquid receiving trough, and means to rotate the shell, and the delivery line in unison about the axis of said shaft to enable bodily flow of the mixed liquor generally axially through the shell, with the flocculant solids within the shell having a radial settling velocity component and an axial flow velocity component to move along a path angling radially and downwardly towards the surrounding wall of the shell.

11. In an activated sludge type sewage treatment system having an aeration tank for holding a body of mixed liquor comprised of a liquid menstruum and flocculant solids of slightly greater specific gravity than the liquid menstruum, apparatus for separating the liquid menstruum from the mixed liquor and comprising a vertically extending tubular shaft having an upper portion above the body and provided with an air inlet and having a lower portion submerged in the body and carrying an aspirating impeller blade structure, said impeller blade structure having an intake eye that communicates with the air inlet through the length of the shaft, a liquid reception tank encircling said upper portion, a generally vertically extending shell fixed on said lower portion to be disposed above said impeller blade structure, said shell having a surrounding wall of maximum diameter at one end of the shell, said shell having radially inwardly disposed inlet means at said one end communicating with a region of the body there adjacent and having spaced radially inner and outer outlet means at the other end, said radially outer outlet means communicating with a region of the body adjacent the periphery of the impeller blade structure and said radially inner outlet means communicating with a vertical liquid delivery line that is rotatable with the shell and shaft to pump into the liquid reception tank, and means to rotate the shaft, the shell, and the impeller blade structure in unison about a common vertical axis to enable bodily flow of the mixed liquor generally vertically through the shell, with the flocculant solids within the shell having a radial settling velocity component and a vertical flow velocity component to move along a spiral vortex path angling radially and vertically towards the surrounding wall of the shell, said surrounding wall having an angle to vertical insuring movement through said radially outer bottom outlet of any solids contacting said wall, and with said impeller blade structure concurrently discharging air into the body and mechanically stirring the body at the region of solids discharge to encourage a solids suspension environment in the tank.

12. In an activated sludge type sewage treatment system having an aeration tank for holding a body of mixed liquor comprised of a liquid menstruum and flocculant solids of slightly greater specific gravity than the liquid menstruum, apparatus for separating the liquid menstruum from the mixed liquor and comprising a vertically extending tubular shaft having an upper portion above the body and provided with an air inlet and having a lower portion submerged in the body and carrying an aspirating impeller blade structure, said impeller blade structure having an intake eye that communicates with the air inlet through the length of the shaft, a liquid reception tank encircling said upper portion, a generally vertically extending shell fixed on said lower portion to be disposed above said impeller blade structure, said shell having a surrounding wall of maximum diameter at the bottom of the shell, said shell having radially inwardly disposed top inlet means communicating with a region of the body adjacent the top of the shell and having spaced radially inner and outer bottom outlet means, said radially outer bottom outlet means communicating with a region of the body adjacent the periphery of the impeller blade structure and said radially inner bottom outlet means communicating with a vertical liquid delivery line that is rotatable with the shell and shaft to pump into the liquid reception tank, and means to rotate the shaft, the shell, and the impeller blade structure in unison about a common vertical axis to enable bodily flow of the mixed liquor generally downwardly through the shell, with the flocculant solids within the shell having a radial settling velocity component and a vertical flow velocity component to move along a spiral vortex path angling radially and downwardly towards the surrounding wall of the shell, said surrounding wall having an angle to vertical insuring movement through said radially outer bottom outlet of any solids contacting said wall, and with said impeller blade structure concurrently discharging air into the body and mechanically stirring the body at the region of solids discharge to disperse solids into said body as the solids emerge from the radially outer bottom outlet means.

13. In marine waste treatment apparatus for separating a solids-liquid mixture in which the solids are slowly settleable under gravity settling conditions, a tank providing a reservoir for the solids-liquid mixture, gimbal means mounted across the top of the tank, a shaft carried by the gimbal means for rotation about a vertical axis, a housing mounted on the shaft and submerged in the mixture to define a separating chamber having a mixture inlet at one end and radially spaced outlets for solids suspension and liquid at the other end, a delivery line leading from one of said outlets and terminating at an elevated external location radially outward of the inlet, and means for rotating the shaft, the housing and the delivery line about said vertical axis to produce a gyroscopic effect tending to maintain said axis vertical during pitching and rolling movement of said tank and to create bodily flow of the mixture through the chamber under the influence of a differential centrifugal field to cause clear liquid to migrate towards said liquid outlet and to cause solids to migrate towards said solids outlet during flow through said chamber.

14. In marine waste treatment apparatus for separating a solids-liquid mixture in which the solids are slowly settleable under gravity settling conditions, a tank providing a reservoir for the solids-liquid mixture, gimbal means mounted across the top of the tank, a shaft carried by the gimbal means for rotation about a vertical axis, said shaft having an upper end providing an external air intake and having a lower end submerged in the mixture and carrying an aspirating impeller blade structure communicating with said intake through said shaft, a housing mounted on the shaft, above and adjacent said impeller blade structure and submerged in the mixture to define a separating chamber having a mixture inlet at its top end and radially spaced outlets for solids suspension and liquid at its bottom end, a delivery line leading from one of said outlets and terminating at an elevated external location radially outward of the inlet, and means for rotating the shaft, the housing and the impeller blade structure and the delivery line about said vertical axis to produce a gyroscopic effect tending to maintain said axis vertical during pitching and rolling movement of said tank and to create bodily flow of the mixture through the chamber under the influence of a differential centrifugal field to cause clear liquid to migrate towards said liquid outlet and to cause solids to migrate towards said solids suspension outlet during flow through said chamber.

15. In marine sewage treatment apparatus for separating a solids-liquid mixture in which the solids are slowly settleable under gravity settling conditions, a tank providing a reservoir for the solids-liquid mixture, gimbal means mounted across the top of the tank, a shaft carried by the gimbal means for rotation about a vertical axis, a shell-like housing having a cylindrical surrounding wall and mounted on the shaft to be submerged in the mixture to define a separating chamber having a mixture inlet at one end and radially spaced outlets for solids and liquids at the other end, a delivery line leading from one of said outlets and terminating at an elevated external location radially outward of the inlet, and means for rotating the shaft, the housing and the delivery line about said vertical axis to produce a gyroscopic effect tending to maintain said axis vertical during pitching and rolling movement of said tank and to create bodily flow of the mixture through the chamber under the influence of a differential centrifugal field to cause clear liquid to migrate radially inwardly towards said liquid outlet and to cause solids to migrate radially outwardly towards said solids suspension outlet during flow through said chamber, said surrounding wall having an angle to said vertical axis to insure travel towards said solids suspension outlet of any solids contacting said surrounding wall.

References Cited

UNITED STATES PATENTS

| | | | |
|---|---|---|---|
| 1,336,722 | 4/1920 | Behr | 210—84 X |
| 1,360,708 | 11/1920 | Avrutik | 210—73 |
| 2,254,127 | 8/1941 | Underwood | 233—45 |
| 2,425,932 | 8/1947 | Green et al. | 210—84 |
| 2,628,021 | 2/1953 | Staaff | 233—14 |
| 2,685,369 | 8/1954 | Crossley | 210—49 |
| 2,967,618 | 1/1961 | Vane | 210—84 |
| 3,226,317 | 12/1965 | Albertson | 233—14 X |

FOREIGN PATENTS 1,275,728  10/1961  France.

SAMIH N. ZAHARNA, *Primary Examiner.*

JOHN ADEE, *Assistant Examiner.*

U.S. Cl. X.R.

210—73, 202, 207, 220, 256; 233—14, 22, 45